United States Patent Office 3,192,146
Patented June 29, 1965

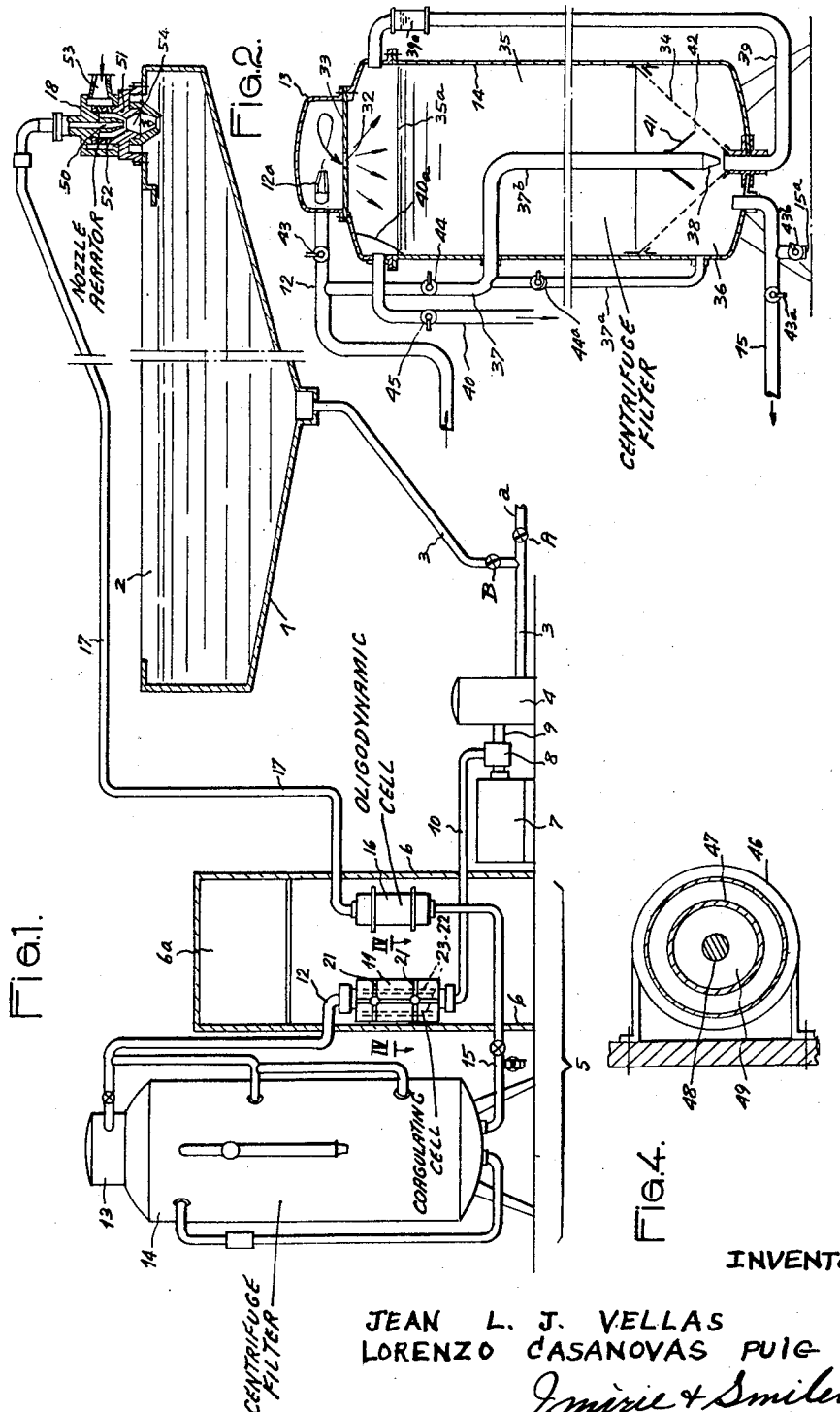

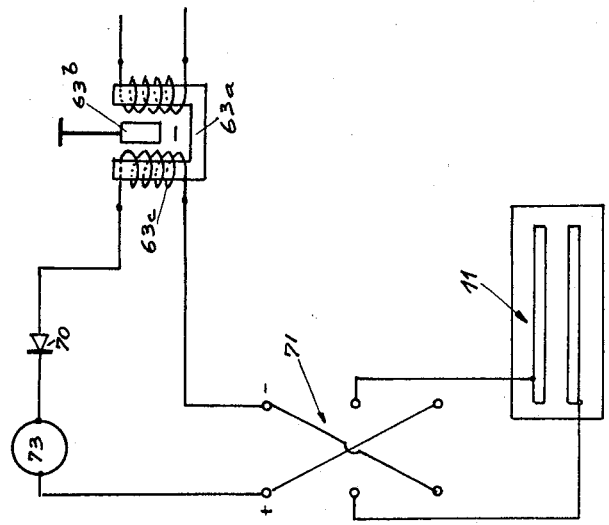
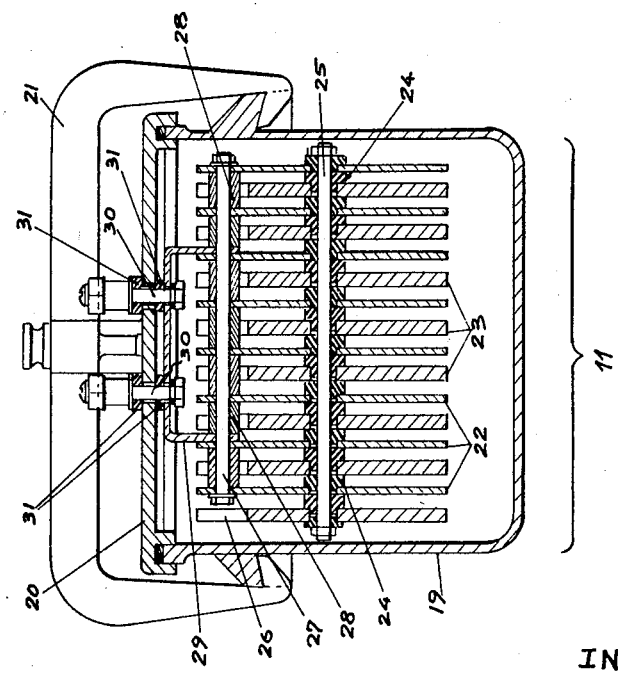

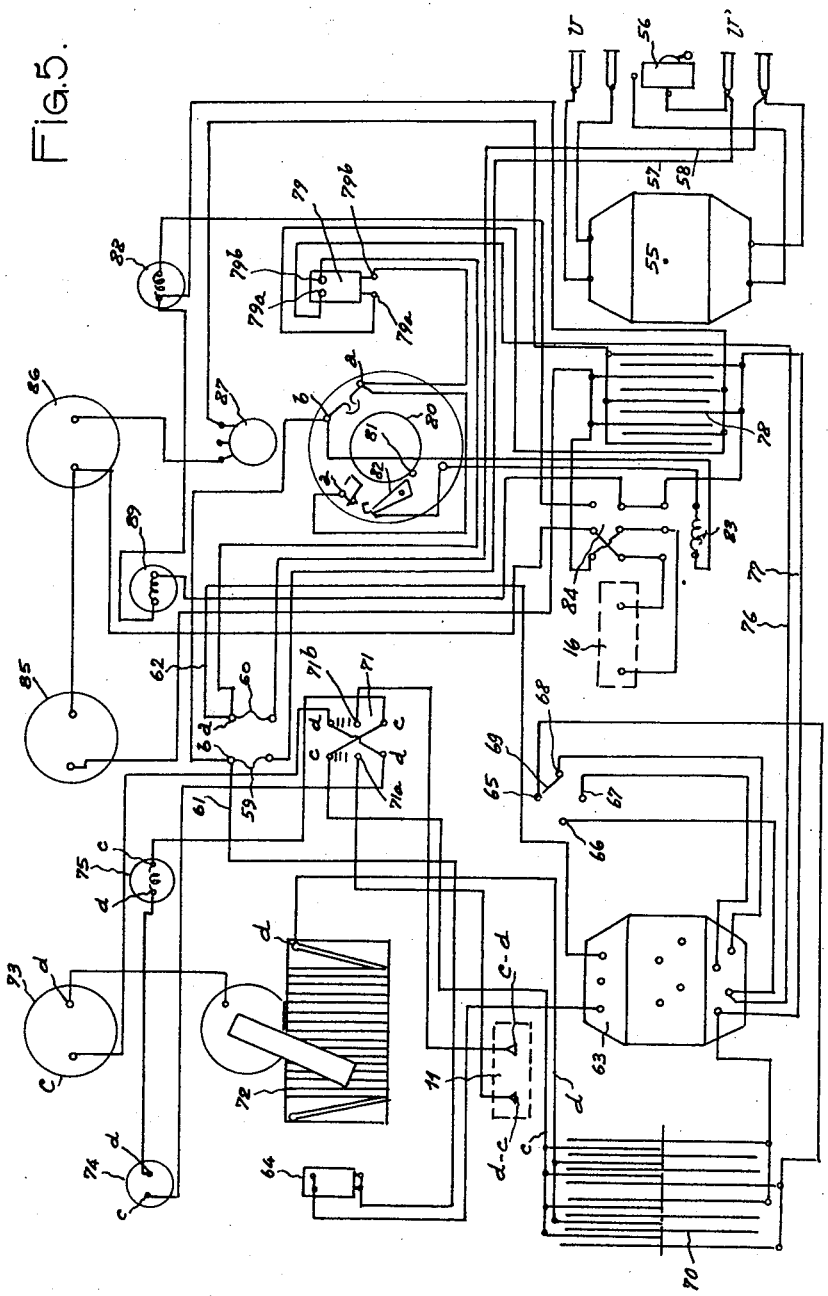

3,192,146
EQUIPMENT FOR PURIFICATION AND STERILIZATION OF SWIMMING POOL WATERS
Jean Léon Justin Vellas and Lorenzo Casanovas Puig, Toulouse, Haute-Garonne, France, assignors to Societe d'Etude et de Diffusion de Procedes et Brevets S.A., Geneva, Switzerland, a company of Switzerland
Filed June 14, 1960, Ser. No. 36,060
Claims priority, application France, June 17, 1959, 797,765, Patent 1,227,164
4 Claims. (Cl. 204—240)

Chemical and bacteriological examinations of crude waters used in swimming pools reveal that these waters contain considerable quantities of impurities formed by organic or inorganic matter, germs and bacilli. Systematic analyses have shown that these waters often contain an excess of nitrites, ammonias, chlorides and organic matter, as well as various colonies, mildews, corynebacterium, straphylococci, colibacilli, sundry bacteria and yeasts, etc. which are obviously seriously dangerous for bathers.

To be able to act on all these various elements, different types of equipment are already known to cause operations of chemical processes, and in particular it is known to utilize purifying equipment employing aluminum sulphate or ferric sulphate or copper sulphate for coagulation, with their adjuvants of coagulation, and products derived from chlorine for sterilization. These various processes have numerous disadvantages. Actually, the utilization of alumina sulphates or the like and their adjuvants necessitates a strict supervision and periodical recharging of the products. Moreover, the addition of disinfecting products is always harmful, for although these products generally destroy the essential parts of living colonies, they are also a danger to the human system and bathers are often inconvenienced by chlorine odours, and the waters thus treated set up irritations (to eyes and mucous membranes) after a prolonged stay in the swimming pool.

Furthermore, these various treatments are generally insufficient to prevent the forming of water-weeds which particularly develop on the walls of the swimming pool, so that it is necessary to add weed-killing products and carry out periodical emptying and cleaning of swimming pools, such emptying being frequently necessary such as every week.

The present invention creates a new process and equipment for operating it, which enable the water of a swimming pool to be permanently kept clean, while being certain that the qualities of this water always correspond to those of drinking water. Furthermore, the growing of water-weeds in the swimming pool is eliminated.

According to the invention, the process for the coagulation, filtration, sterilization and oxygenation of waters, in particular those of swimming pools, consists in that the water used for filling the swimming pool, and swimming pool water driven in a closed circuit, are sent through a set of metallic electrodes supplied with pulsating electric current, which emits a sufficient quantity of metallic ions to break the colloidal balance of the waters and start up the flocculation of the matters that they contain, flocculation being then expedited by subjecting the particles in course of agglomeration to a centrifugation in a chamber at the top of a filter retaining the flocculate, from whose outlet the water is directed into a set of silver electrodes emitting insoluble bactericide ions, sterilizing the water and imparting a bacteriostatic condition to it which prevents it from becoming contaminated again.

Various other characteristics of the invention are moreover revealed by the detailed description which follows.

Forms of embodiment of the invention are shown, by way of non-restrictive examples, in the attached drawings.

FIGURE 1 is a diagrammatical elevation partly in section of the equipment for purifying and treating water for a swimming pool according to the invention.

FIGURE 2 is a diagrammatical elevation-section on a larger scale, of one of the pieces of the equipment.

FIGURE 3 is a section, on a larger scale, of another piece of the equipment of FIGURE 1.

FIGURE 4 is a diagrammatical section, on a larger scale, taken substantially along the line IV—IV of FIGURE 1, showing an embodiment detail of another of the members of the equipment.

FIGURE 5 is an electrical diagram of a form of execution.

FIGURE 6 is a partial electrical diagram showing an alternative electric circuit.

In FIGURE 1, a partial diagrammatical view is given of a swimming pool 1 and the equipment assembly for purifying and sterilizing the water 2 contained in this swimming pool.

The initial filling of the pool takes place through a water intake $a$ controlled by a cock A. The water to be purified and sterilized is directed by piping 3 into a pre-filter 4 intended to retain the particles and large objects that it may carry along. This pre-filter has no special particularities, and is not described in more detail hereafter.

A suction and force pump 8, driven by a motor 7, is connected to the pre-filter 4 by a pipe 9 and forces the water coming from the piping $a$ through a pipe 10 towards the treatment equipment designated as a whole by the reference numeral 5.

When the pool 1 is full, the cock A conveying the water used for the initial filling coming from $a$ is closed, the cock B fitted on the piping 3 taking the water 2 from the bottom part of the pool 1 is opened, and the water is then re-cycled in a closed circuit.

The assembly 5 as well as the pre-filter and pump, can equally well be placed close to the swimming pool or else relatively distant from the latter, and oxygenation preferably takes place just where the water enters the pool.

The assembly 5 comprises a cabinet 6 in whose lower part are the sets effecting the treatment for coagulation 11 and sterilization 16, and at whose top part a chamber 6a is provided containing the mechanism for supplying, controlling and regulating, enabling the necessary release of the ions coming from the electrodes equipping the sets and intended to treat the water.

The water forced by the pump 8 is directed by piping 10 into a coagulation set 11 which is described hereafter in detail with reference to FIGURE 3.

On leaving the coagulation set 11, the water is directed by a pipe 12 to the inlet 13 of a filtering tank 14 whose particular embodiment is shown in FIGURE 2 and described hereafter.

After filtering, the water is directed by means of a pipe 15 into an electric sterilization set 16 in which this water is submitted to an electro-oligodynamic treatment of a special kind, before being directed, by means of piping 17, towards an oxygenating device 18 through which it is returned into the swimming pool 1.

As explained above, the pre-filter 4, which is only intended to retain the larger particles, has no special features.

The coagulation set 11, into which the water is forced by the pump 8, comprises, as shown in FIGURE 3, a tank 19 closed by a cover 20 which is attached to the tank by means of flanges 21 (FIGURES 1 and 3) which can be easily removed so as to facilitate the subsequent cleaning of the electrodes with which the set is provided.

The electrodes of this set are of two different kinds, i.e., this set comprises a set of electrodes 22, preferably of rustless steel, acting as cathodes, and a set of electrodes 23, preferably of aluminum, acting as anodes. These different electrodes overlap one another and are connected to each other by means of insulating studs 24 forming cross-pieces which are themselves connected by a pin 25. Moreover, the electrodes of each set respectively possess notches 26 which are staggered from one set to the other so as to enable an electric connection between the electrodes of each set.

According to FIGURE 3, the notches 26 of the aluminum electrodes are shown in electric liaison with the rustless steel electrodes connected by a pin 27 on to which conducting washers 28 are threaded acting electrically to connect the various electrodes 22. The support of the electrodes 22 as well as their electric current supply is effected by means of a yoke 29 supported by the cover 20 to which it is mechanically connected by screws 30 electrically insulated from this cover by means of washers 31. At least one of the screws 30 forms a terminal for leading-in the current to the electrodes 22. The mounting and electric current supply of the electrodes 23 are carried out in a strictly identical manner.

As can be seen from the foregoing, this particular embodiment enables all the electrodes to be supported by the cover 20, and consequently, the electrodes can be easily withdrawn from the tank 19 for cleaning and possibly changing when they are worn out.

As shown in FIGURE 1, the electrodes are so arranged that they extend parallel to the course taken by the liquid current traversing the tank 19 of the set so that the distribution of the water takes place in a proper manner between the various electrodes, and consequently, the treatment of the entire mass of water is effected in a homogeneous way.

By way of example, in order to obtain a suitable coagulation treatment, it has been found to be advantageous, in an equipment of the kind shown comprising a pool of 60 m.$^3$ and a pump with a delivery of 3 m.$^3$ per hour, to use twelve rustless steel electrodes and eleven aluminium electrodes each having a surface of about 200 cm.$^2$, the various electrodes being separated by a space of 3.5 mm. The current used for supplying the electrodes of the coagulation set is a pulsating current which enables the release of ions to be obtained while avoiding the polarization effects of the electrodes.

These ions have the effect of breaking the colloidal and electric balance of the waters.

The matter in suspension contained in the waters becomes polarized and the attraction, which is the rule, entails their flocculation.

Coagulation can be defined as follows:
Attraction of contrary sign particles,
Neutralization of charges as soon as contact is obtained, and
Sedimentation.

For suitably treating a pool of 60 m.$^3$, the quantity of current used, during filling, is about 200 watts, and for maintenance, from 200 to 300 watts per day according to the ambient medium.

The values given above by way of example effect a treatment enabling a rational flocculation of the waters treated.

To facilitate the agglutination of matters which may not yet have agglomerated between the exit from the set 11 and the entrance into the filter 14, the latter is fitted with a chamber 13 at its top part forming a bell into which the pipe 12 emerges through a nozzle 12a placed tangentially to its wall. This arrangement has the effect of centrifuging the particles in course of coagulation and speeding up the formation and enlarging of flakes before the water penetrates into the body of the filter 14.

The water and flakes formed are directed towards the interior of the filter through a port or ports 32 made in a partition 33 isolating the chamber 13 placed at the top of the filter inside the latter.

As shown in FIGURE 2, a gauze 34, metallic, for example, is provided at the lower part of the filter, which delimits a cone-shaped hopper acting for holding a sand mass 35, or other filtering medium, whose upper level is shown at 35a. This sand mass has the effect of retaining the coagulated matter. The water freed from coagulated impurities passes through the gauze 34 and is collected in the settling chamber 36 delimited underneath said gauze 34 by the bottom of the filter.

To enable the charge of filtering sand or filtering material contained in the filter to be cleaned, a by-pass pipe 37 is provided branched on the pipe 12. This by-pass pipe has a branch 37b terminated by a nozzle 38 which emerges above the outlet of a by-pass piping 39.

As shown in the drawing, the outlet of this piping is placed at the summit of the cone formed by the gauze 34 supporting the charge of sand or filtering materials and this by-pass brings the upper part of the filter above the normal level 35a of the charge of sand or filtering material.

The pipe 37 has a second branch 37a which emerges into the chamber 36, i.e., below the gauze 34.

40 designates a discharge and pet-cock pipe whose outlet is protected by metal gauze 40a so that the filtering material 35 cannot be evacuated during cleaning operations. In addition to these various pipes, the filter comprises a by-pass branch 37b, a deflector 41, of steel, for example, which, with the gauze 34, delimits an annular passage 42 of very small section, but nevertheless sufficient to enable grains of sand or filtering material to pass through this channel when the filter is being cleaned. This cleaning takes place in the following manner:

The cocks 43 and 43a, are first of all closed that are placed below the by-pass 37 on the pipe 12 and on the discharge 15, then the cocks 44, 44a and 45 are opened that are respectively mounted on the by-pass 37, 37a and on the pipe for conducting waste water 40. The water brought in through the pipe 12 is thus obliged to pass through the by-pass 37. The fraction of water led by the branch 37a penetrates into the chamber 36 and sets up a movement in that chamber which has the effect of loosening the sand bearing on the gauze 34 and creating a pressure balance. A second fraction of water brought by the by-pass 37 passes through the branch 37a and leaves through the nozzle 38 so that the current thus created causes a depression below the deflector 41, which has the effect of compelling the grains of sand or filtering material to pass through the annular passage 42. These grains of sand or filtering material are rapidly carried along and hence subjected to mutual friction.

They are then carried along by the by-pass pipe 39 which re-introduces them into the top part of the filter. The stirring which thus takes place in the filter has the effect of completely washing the entire mass of sand or filtering material, the water and impurities being evacuated by the pipe 40 leading to a drain and the protecting gauze 40a preventing the sand or filtering material from being evacuated.

When the water is seen to be clear through the sighting-slit 39a, washing is finished and the circuit is re-established as follows:

The cocks 44, 44a and 45 are closed, whereas the cocks 43 and 43b are opened. The cock 43a remaining closed, the water is directed towards the drain by the by-pass 15a until the filter is stabilized.

The initial working circuit is then re-established when the water runs clear at 15a by opening the cock 43a and closing 43b.

As explained above, the filtered and purified water as previously described, is directed by the pipe 15 towards the sterilization set 16. This set comprises, as shown diagrammatically in FIG. 4, a casing 46 inside of which silver electrodes are placed, which in the case of a 60 m.³ swimming pool, would be two in number.

These annular shaped electrodes, in the example shown in the assembly 5, FIGURE 1 and detail FIGURE 4, can also be plates mounted like the electrodes of the set 11, assembly 5, FIGURE 1, detail FIGURE 3.

In the present case, the electrodes 47 and 48 are about 100 mm. apart and have a total working surface of about 800 cm.².

They delimit between them a channel 49 that the water brought by the pipe 15 is obliged to traverse.

These electrodes are supplied, one acting as cathode, the other as anode, by a pulsating current causing insoluble silver ions to be released which effect the sterilization of the water. This release would be calculated in the case of a swimming pool so as to obtain, in the pool, water charged at 40 or 50 thousandths of milligrams of silver per litre. This charge is sufficient to maintain a pool in a permanent bacteriostatic condition, owing on the one hand, to the bactericide ions, and on the other, to the increase in electric potential preventing any fresh contamination.

A reversing of polarity takes place about every eight minutes so that the electrode operating as cathode becomes an anode and inversely in order to avoid a polarization which might affect the release of the ions emitted and so that both electrodes wear evenly.

So that the water 2 should be not only sterile but also possess characteristics comparable to spring water and that it should be well aerated, it is not taken directly through the pipe 17 into the swimming pool but through the oxygenating device 18 shown in FIGURE 1. This device comprises a nozzle 50 acting as water intake, this nozzle emerging in a tapered part in the shape of a venturi of a body 51, which delimits, around the nozzle 50, a chamber 52 in which a depression is produced owing to the water being ejected by the nozzle 50. This chamber communicating with inlet pipes 53, it follows that air is sucked in and this air is then stirred with the water in a mixing chamber 54 which is delimited by the body 51 below the nozzle 50.

As can be clearly seen from the foregoing, the water is thus oxygenated and its quality corresponds to that of drinking water.

By way of example, for filling a swimming pool comprising the equipment described above for purifying its water, water was used taken from a canal. The chemical analysis of that water before treatment was as follows:

Nitrites _____ Presence
Ammonia _____ Nil
Total hydrotimetric degree _____ 14°

The bacteriological analysis of this water was moreover as follows:

Corynebacterium _____cm.³__ 100
Staphylococci _____cm.³__ 325

After the equipment had been working a sufficient time for all the water in the swimming pool to be treated, the chemical and bacteriological analyses were as follows:

Nitrites _____ Nil
Ammonia _____ Nil
Total hydrotimetric degree _____ 14°
Corynebacterium _____ Nil
Staphylococci _____ Nil
Colibacilli _____ Nil This water thus possessed all the characteristics of a drinking water that could be consumed.

In order that the equipment described above can be completely automatic, the cabinet 6 in which the coagulation set (or sets) and the sterilization set (or sets) are placed, also comprises a regulating mechanism which is arranged in a compartment 6a of this cabinet. The diagram of this mechanism is shown in FIGURE 5.

As can be clearly seen, the regulating equipment comprises an input self-transformer 55 enabling the equipment to be either branched on a 220-volt current source whose terminals are designated by the letter U, or a 110-volt current source whose terminals are designated by the letter U'.

56 designates a switch used for putting the self-transformer 55 into circuit or insulating it, according to the U or U' voltage available for supplying the equipment. The current under the normal mains voltage is led-in by the leads 57, 58 to the fuzes 59, 60. The output terminals $a$, $b$ of these fuzes are used for supplying two distinct chief circuits.

A lead 61 and a lead 62 act for supplying a voltage lowering transformer 63 whose putting into circuit is controlled by a switch 64 which is hand operated mounted on the lead 61.

The secondary winding of the transformer 63 has multiple outputs and these various outputs are connected to terminals 65, 66, 67 and 68, the terminal 65 corresponding, for example, to one of the ends of the secondary of this transformer.

A slide-contact 69 enables the terminal 65 to be connected up to any of the terminals 66, 67 and 68, and consequently to use more or less of the secondary winding of the transformer 63, so that it is thus possible to obtain various voltages, for example, six, twelve and twenty-four volts. The output voltage of the transformer is applied to the input terminals of a rectifying cell 70, of the oxymetal type, for example, which comprises two outputs materialized by the leads $c$ and $d$ of different polarities, respectively negative and positive, which are applied at different points of the electric circuit, as shown by the letters $c$ and $d$ where the latter are borne.

The polarities $c$ and $d$ are more particularly applied to four of the terminals of an inverting switch 71 whose free terminals 71a, 71b are connected to each of the two sets of electrodes of the coagulation set 11. The current coming from the rectifying set 70 traverses a regulating rheostat 72 and is metered in an ammeter 73 before being brought to the inverter 71 whose terminals with the letters $c$ and $d$ are respectively connected to two pilot-lights 74, 75 enabling the position of the inverter to be ascertained.

As can be easily understood, for one of the positions of the inverter, one of the sets of electrodes of the coagulation set 11 is connected to the negative pole, namely, the pole $c$, whereas the other set is connected to the positive pole, namely, that designated by $d$. By changing the position of the inverter handle, the polarities are reversed applied to each of the two sets of electrodes of the coagulation set 11, which enables the inverting of the passage direction of the current in the latter, so that there can thus be a cleaning of the electrodes when they have reached a certain rate of polarization, which rate can be perceived by the deviation of the ammeter 73 which tends to lower when the polarization of the electrodes increases.

Seeing that the current is rectified in a cell not comprising a dephasing circuit, the current which is supplied to the electrodes corresponds only to one of the alterations of the alternating current coming from the transformer 63 and consequently, this current is a pulsating current, which has been found preferable to any other form of supply, for it was noticed that the destruction of microbic fauna contained in the water is much more active when this fauna is subjected to current impulses rather than to a direct current with uniform voltage. Actually, it was noticed that the elements of microbic fauna are abruptly contracted at each current impulse, which entails their speedy death.

In addition to the supply described above of the coagulation set 11, the transformer 63 is also used for supplying the sterilization set 16. To this end, the leads 76, 77 connected to the transformer 63 outputs, supply a second rectifying cell 78 whose energization is controlled by a switch 79 intended to close two distinct circuits, namely, that of the rectifying set 78 when the studs 79a are united and that of the electric motor 80 when the studs 79b are united. The motor 80 is supplied as soon as the set 78 is put under voltage and its supply is effected by the mains current coming from the terminals a, b of the fuze outputs 59, 60. The polarity of these terminals a, b is shown by the same letters at the entrance to the motor.

The motor 80 acts for driving a reducing gear (not shown) actuated by a finger 81 and switch 82 which is thus periodically opened and closed at the end of a certain lapse of time which may be, for example, about ten minutes. This switch 82 is intended to energize and then cause to drop and then to re-energize, and so on, a relay 83 electrically connected to the terminals a and b of the fuzes 59 and 60. This relay operates an inverter 84 inverting the polarity of the current which is applied to the two electrodes of the sterilization set 16.

The voltage and intensity of the current at the terminals of the electrodes of the sterilization set 16 are respectively metered by a voltmeter 85 and an ammeter 86 and are regulated by means of a rheostat 87. Moreover, the passage direction of the current is indicated by the pilot lights 88 and 89.

The various metering appliances, namely, the ammeter 73, the voltmeter 85 and the ammeter 86 as well as the regulating members formed by the rheostat 72, the rheostat 87, the switches 56, 64 and 79 are placed on an instrument panel arranged in a compartment 6a of the cabinet 6 and this instrument panel is also provided with various pilot lights 74, 75 and 88, 89, so that the working of the equipment can be easily ascertained at any time, which makes its utilization extremely easy.

As shown in FIGURE 6, it is possible somewhat to simplify the control diagram of the equipment while moreover obtaining a particularly sensitive regulating of the current delivered into the coagulation set 11. This is obtained by replacing the step-down transformer 63 with variable tap by a transformer 63a comprising a plunger 63b. The secondary winding 63c of this transformer is then connected by the rectifying cell 70 and the ammeter 73 to two of the terminals of the inverter 71, which moreover, is branched in the same manner as described above with reference to FIGURE 5.

As can be clearly seen from the foregoing, the working of the purifying equipment for a swimming pool is entirely automatic and only requires a very limited supervision, seeing that it is only necessary periodically to check that the ammeter 73 does not show too much polarization of the electrodes of the coagulation set. When the state of limit polarization is reached, it is then only necessary to operate on the inverter 71, the other adjustments remaining unchanged.

The invention is not restricted to the forms of embodiment shown and described in detail, for various modifications can be applied to it without going outside of its scope. In particular, the inverting of the polarity of the coagulation set can be automatically effected by a device sensitive to the polarization state of the electrodes of this set.

We claim:

1. Apparatus for purifying, sterilizing and oxygenating water in a continuously circulating swimming pool system, comprising in series
    coagulating means for coagulating impurities contained in the water, said coagulating means including a container having an inlet and an outlet connected with said system, a plurality of flat electrodes arranged in said container parallel with the flow of water between said inlet and outlet, and means supplying a low-voltage pulsating direct current to said electrodes;
    centrifuging means for separating from the water the flocculate produced by said coagulating means, said centrifuging means including top, bottom and cylindrical side walls cooperating to define a chamber, said cylindrical wall having a vertical axis, and means connected with said coagulating means for introducing the electrically treated water tangentially into said chamber, said bottom wall containing a central outlet;
    filter means arranged below and in communication with the outlet of said centrifuging means for filtering impurities from the water;
    sterilizing means connected to receive the filtered water from said filter means and operable to add silver ions thereto, said sterilizing means including at least one silver anode, and means for supplying low-voltage pulsating direct current to said silver anode;
    and static air mixing means connected with said sterilizing means for oxidizing the ionized filtered water and for discharging the same into said swimming pool.

2. Apparatus as defined in claim 1 wherein said filter means includes a housing having an upper wall common with the bottom wall of said centrifuging means, said housing including a chamber containing charges of sand and activated charcoal.

3. Apparatus as defined in claim 2 wherein said air mixing means includes a mixing chamber, and venturi means connected with said sterilizing means for discharging sterilized water and for drawing atmospheric air into said mixing chamber.

4. Apparatus for purifying, sterilizing and oxygenating water in a continuously circulating swimming pool system, comprising in series
    coagulating means for coagulating impurities contained in the water, said coagulating means including a container having an inlet and an outlet connected with said system, a plurality of flat electrodes arranged in said container parallel with the flow of water between said inlet and outlet, and means supplying a low voltage pulsating direct current to said electrodes;
    centrifuging means for separating from the water the flocculate produced by said coagulating means, said centrifuging means including top, bottom and cylindrical side walls cooperating to define a chamber, said cylindrical wall having a vertical axis, and nozzle means connected with said coagulating means for introducing the electrically treated water tangentially into the chamber, said bottom wall containing a central outlet;
    filter means including a housing having an upper wall common with the bottom wall and containing a chamber in communication with the outlet of said centrifuging means, said filter means including a charge of filter material for removing impurities from the water, and washing circuit means for washing impurities from said charge of filter material and including an evacuating duct through which the impurities are removed;
    sterilizing means connected with said filter means for charging said filtered water with a small amount of silver ions, said sterilizing means including at least one silver anode, and means supplying said electrode with low-voltage pulsating current;
    and static air mixing means connected with said sterilizing means for oxidizing the ionized filtered water and for discharging same into said swimming pool, said mixing means including a mixing chamber, and venturi means for introducing the sterilized water into, and simultaneously drawing atmospheric air into, said mixing chamber.

(References on following page)

References Cited by the Examiner

UNITED STATES PATENTS

| | | | |
|---|---|---|---|
| 649,530 | 5/00 | Ritter | 210—304 |
| 937,210 | 10/09 | Harris | 204—149 |
| 961,924 | 6/10 | Wohlwill | 204—109 |
| 2,036,949 | 4/36 | Meinzer | 204—137.5 |
| 2,046,467 | 7/36 | Krause | 204—149 |
| 2,344,548 | 3/44 | Goetz | 204—149 |
| 2,590,581 | 3/52 | Shirley | 210—169 |
| 2,640,026 | 5/53 | Whittington | 204—149 |
| 2,658,033 | 11/53 | Ferris | 204—152 |
| 3,092,566 | 6/63 | Negus | 204—152 |

FOREIGN PATENTS 384,466   1/32   Great Britain.

WINSTON A. DOUGLAS, *Primary Examiner.*

JOSEPH REBOLD, MURRAY TILLMAN, *Examiners.*